Figure 1:
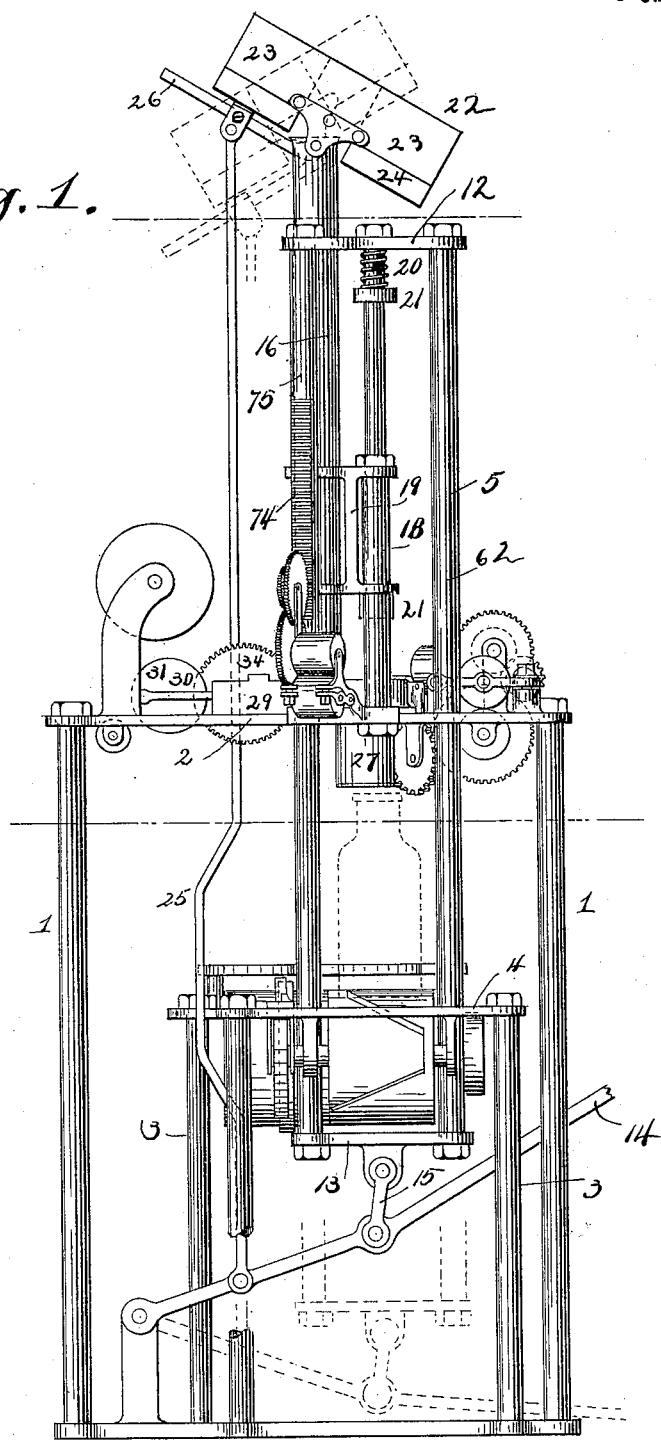

No. 610,381. Patented Sept. 6, 1898.
G. G. BROWN.
MACHINE FOR CORKING BOTTLES.
(Application filed Mar. 19, 1897.)
(No Model.) 5 Sheets—Sheet 1.

Witnesses Inventor
By his Attorneys

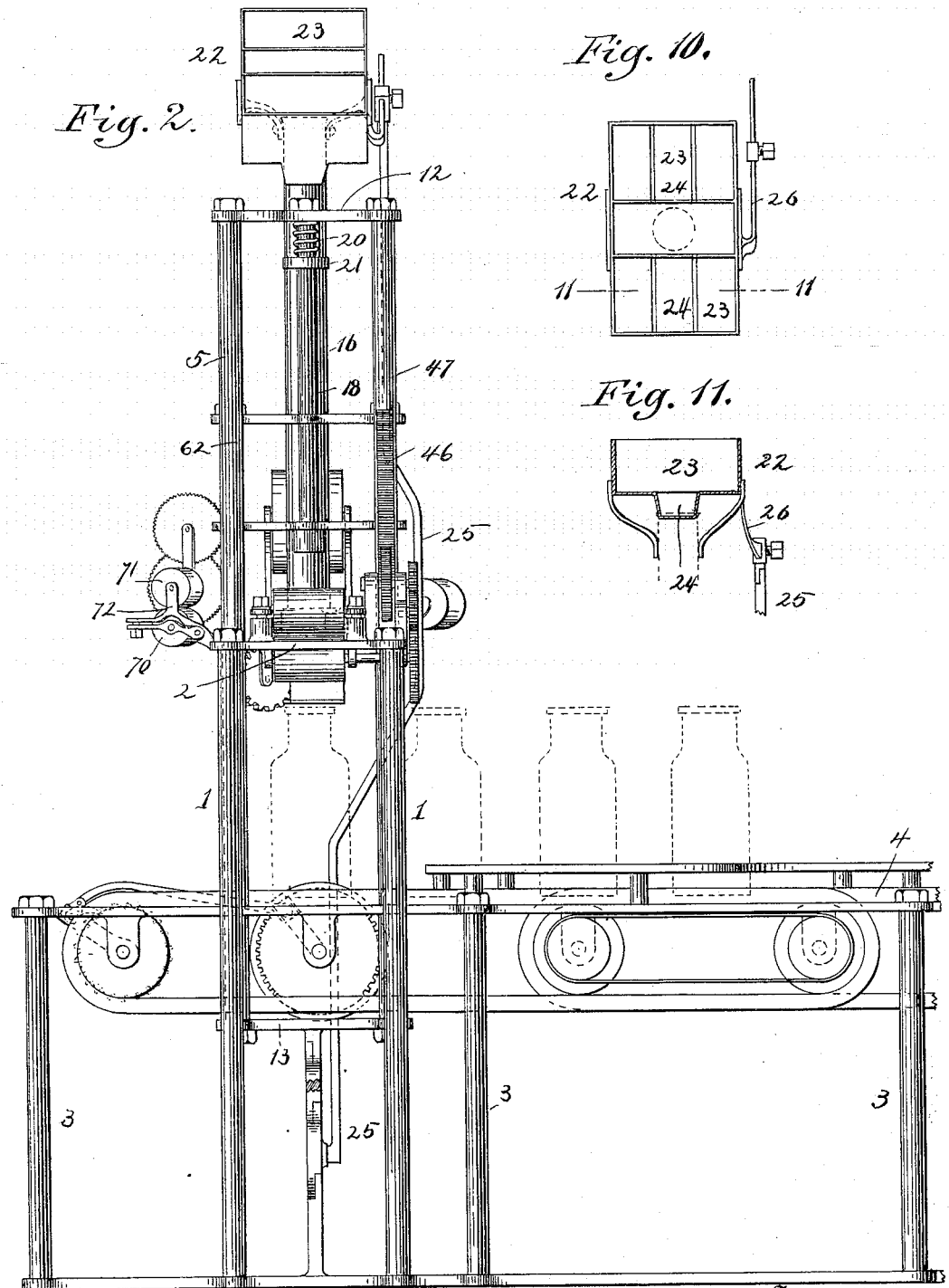

No. 610,381. Patented Sept. 6, 1898.
G. G. BROWN.
MACHINE FOR CORKING BOTTLES.
(Application filed Mar. 19, 1897.)
(No Model.) 5 Sheets—Sheet 3.
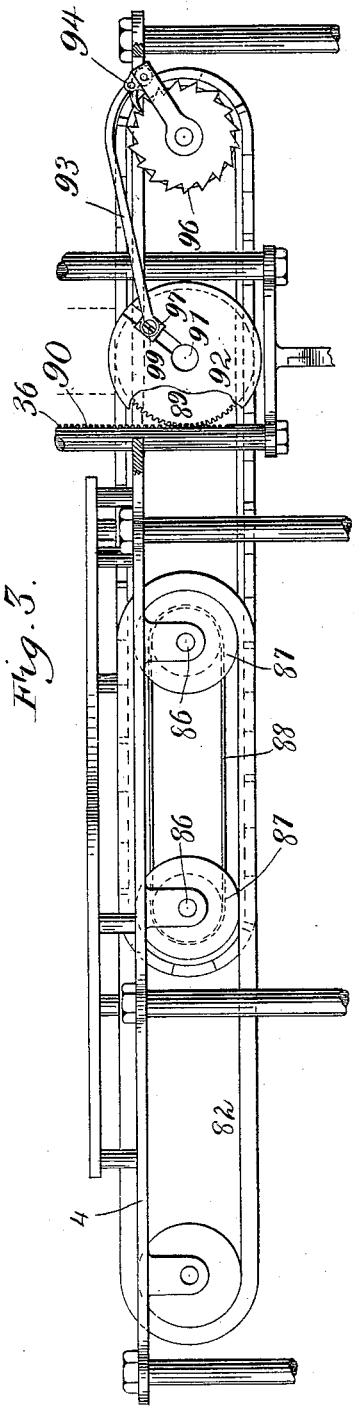
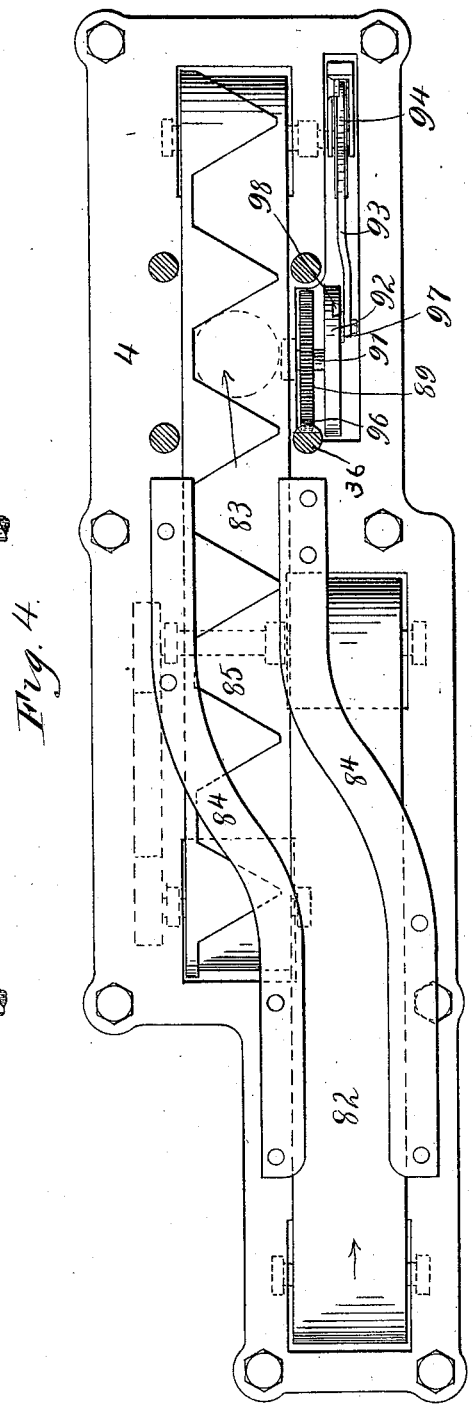

No. 610,381. Patented Sept. 6, 1898.
G. G. BROWN.
MACHINE FOR CORKING BOTTLES.
(Application filed Mar. 19, 1897.)
(No Model.) 5 Sheets—Sheet 4.
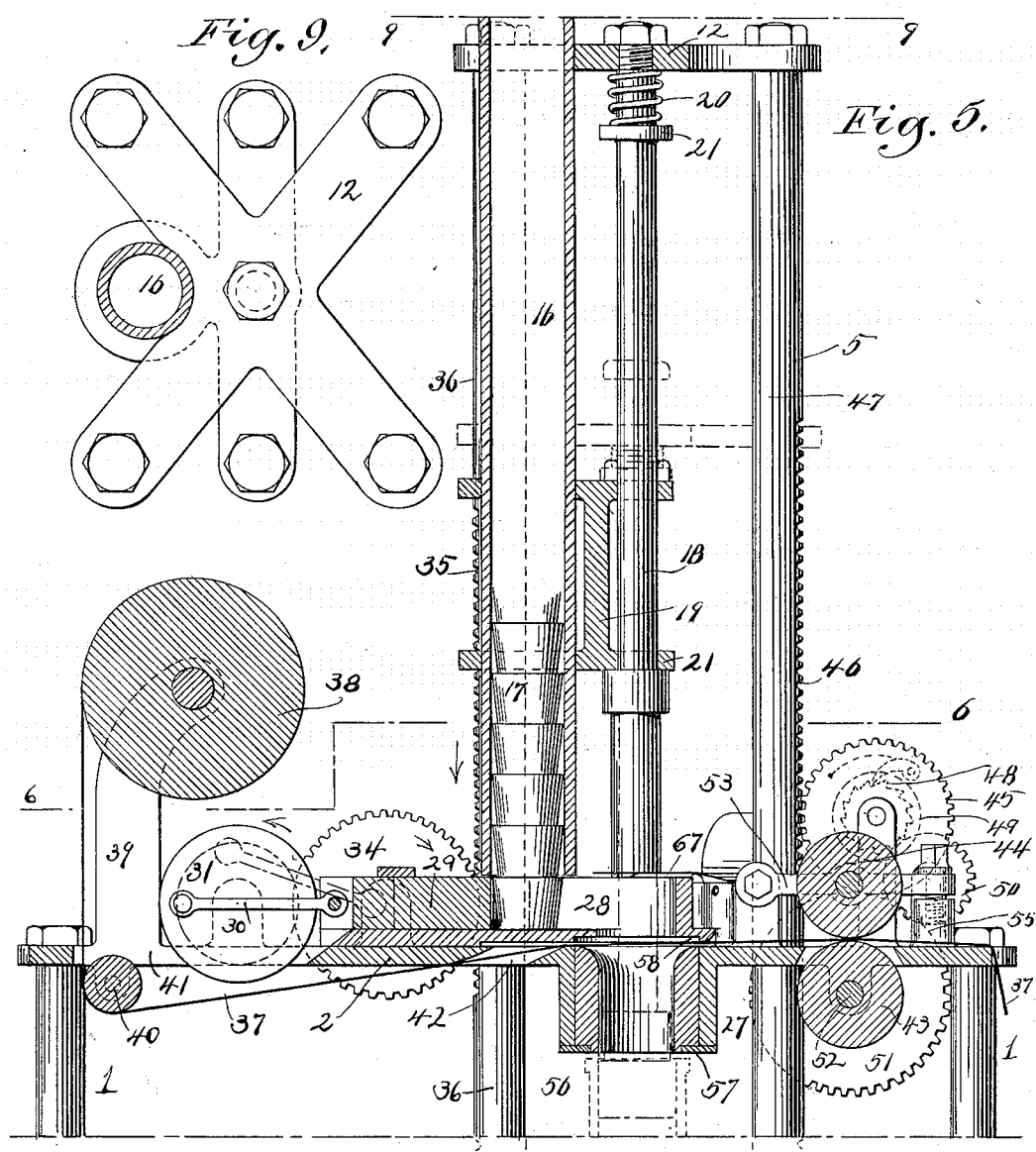
Witnesses
Inventor
By his Attorneys No. 610,381. Patented Sept. 6, 1898.
G. G. BROWN.
MACHINE FOR CORKING BOTTLES.
(Application filed Mar. 19, 1897.)
(No Model.) 5 Sheets—Sheet 5.
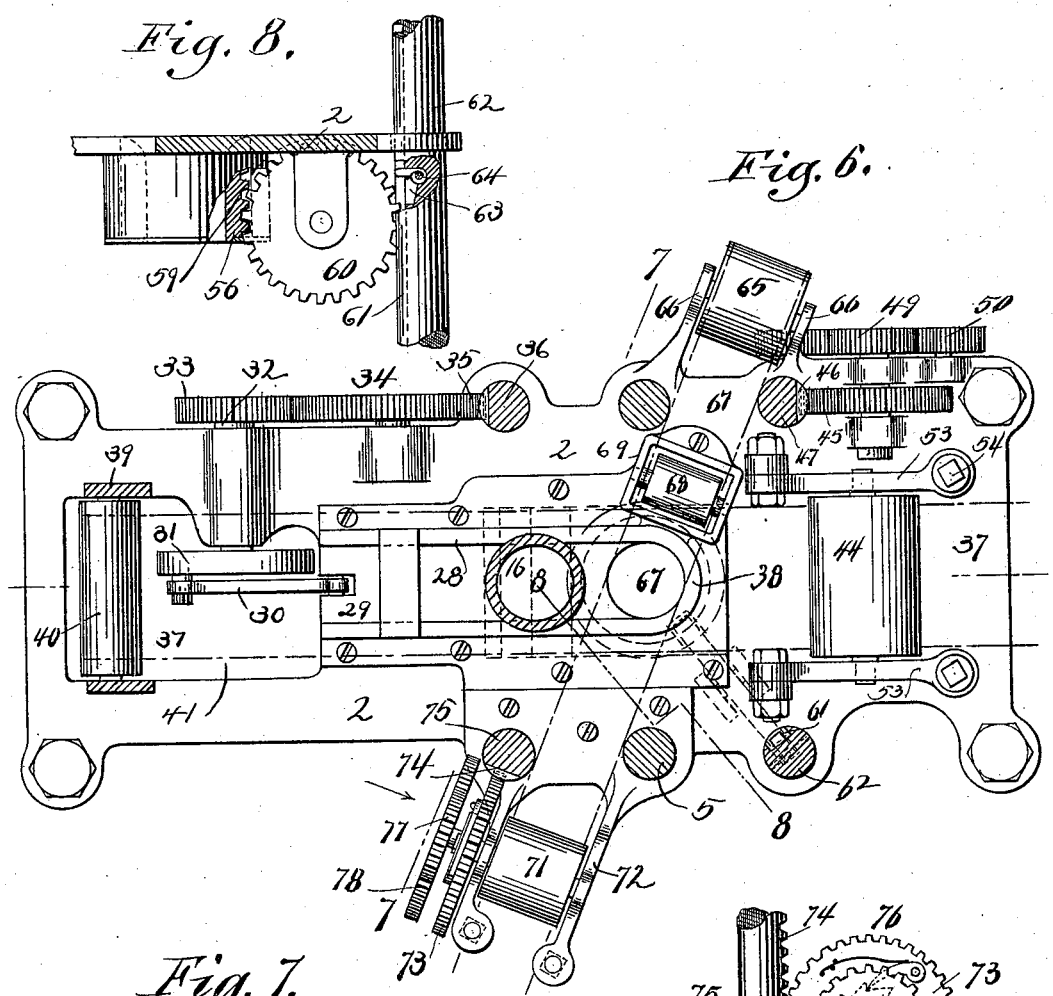

UNITED STATES PATENT OFFICE.

GOVEURNEER GRAHAM BROWN, OF NEW YORK, N. Y.

MACHINE FOR CORKING BOTTLES.

SPECIFICATION forming part of Letters Patent No. 610,381, dated September 6, 1898.

Application filed March 19, 1897. Serial No. 628,274. (No model.)

*To all whom it may concern:*

Be it known that I, GOVEURNEER GRAHAM BROWN, a citizen of the United States, and a resident of New York, (Brooklyn,) county of Kings, and State of New York, have invented certain new and useful Improvements in Machines for Corking Bottles, of which the following is as pecification, reference being had to the accompanying drawings, forming a part thereof, in which similar figures of reference indicate corresponding parts.

This invention relates to a machine for corking bottles; and it has for its object to provide a simple and improved machine of this class in which the complete operation of feeding the bottles and inserting the cork or stopper and the detail accessory operations of applying a label and inserting a packing of tin-foil or analogous material will all be automatically and correlatively effected by a single movement of a main lever or pedal-arm.

In the drawings, Figure 1 is a side elevation of my improved bottle-corking machine. Fig. 2 is a front end elevation of the same. Fig. 3 is a detail side elevation of the bottle-feeding mechanism. Fig. 4 is a detail plan view of the bottle-feeding mechanism. Fig. 5 is a detail vertical sectional view of the cork-feeding and plunger mechanism, illustrating also the mechanism for feeding the tin-foil or analogous material for forming a cork or stopper packing. Fig. 6 is a detail horizontal sectional view taken on a line 6 6, Fig. 5. Fig. 7 is a detail vertical sectional view taken on a line 7 7, Fig. 6. Fig. 8 is a detail vertical sectional view taken on a line 8 8, Fig. 6. Fig. 9 is a detail plan view taken on a line 9 9, Fig. 5. Fig. 10 is a top or plan view of the feeding-hopper for the corks and stoppers. Fig. 11 is a detail transverse sectional view of said hopper, taken on a line 11 11, Fig. 10.

Referring to the drawings, 1 designates a suitable main frame carrying a top table or platform 2, and 3 is a supplementary frame arranged below the main frame and preferably at right angles thereto and carrying a top table or platform 4 a suitable distance below the platform 2. Within the frames 1 and 3 and through the platforms 2 and 4 operates a vertically-sliding frame 5, comprising four corner posts or rods connected by a top plate 12 and a bottom plate 13. The frame 5 is operated in its vertical movement by means of a lever 14, arranged to be operated by pedal or hand movement, said lever being fulcrumed at the lower portion of the main frame 1 and connected to the bottom of the sliding frame 5 by the link 15. Mounted with relation to the frame 5 is a vertical tube or cylinder 16, extending upwardly from the main table 2 and adapted to successively feed the corks or stoppers 17. Centrally within the frame 5 is carried the plunger 18, which may be braced and guided by bracket 19, projecting from the cylinder 16, and the plunger may have an independent vertical movement with relation to its carrying-frame 5 against the tension of a coil-spring 20, interposed at the top, said movement being regulated by suitable top flanges or collars 21. The purpose of this spring-governed independent movement of the plunger is to provide for the air-exhaust which occurs in the operation of inserting the stopper in the bottle, and the spring can also operate to return the frame 5 to normal position.

Upon the top of the cylinder 16, above the frame 5, is pivotally mounted the hopper 22 for automatically feeding the corks to the conveying tube or cylinder. This hopper is adapted to be carried upon its central or intermediate pivot and comprises two side boxes or independent receptacles 23 23, each having a transverse central depressed channel 24, into which the corks are adapted to be assembled and from the open inner ends of which the corks will drop in proper position into the conveying-tube 16 as the double hopper is rocked or oscillated. The hopper is operated by means of the pivoted connecting-rod 25, extending downwardly and pivoted to the main operating-lever 14, the top pivotal connection of which rod is preferably adjustable upon an arm or bar 26, extending from the hopper, so that the rocking movement of the latter can be suitably regulated.

27 designates a tubular extension depending from the table 2 at a point in line with the stroke of the plunger 18, through which extension the corks are driven by operation of the plunger in the neck of the bottle. Upon the table 2, with relation to the tubular extension 27, is mounted a suitable guide-frame 28, within which works a sliding block 29, operating at right angles to the movement of the plunger 18 and under the feed-cylinder 16, so that by action of this block the lowermost cork of the set filling the cylinder 16 is carried within the frame 28 into position under and with relation to the plunger 18 and in simultaneous relation to the downward stroke of the latter. The block 29 is operated by means of a pitman 30, connected with a crank or disk 31 upon the end of a shaft 32, journaled upon the plate or platform 2 in transverse relation to the line of movement of the block 29 and carrying at its outer end a gear 33, meshing with a gear 34, journaled upon the plate or platform 2 and operated by a vertical rack 35 upon the rear right-hand corner-rod 36 of the vertically-moving frame 5. (See Figs. 5 and 6.) Thus in the downward movement of the frame 5 and the corresponding movement of the plunger 18 the gear mechanism is simultaneously operated to cause the movement of the block 29 and one of the corks or stoppers 17 into position under the plunger, so that it is driven by operation of the latter into the neck of the bottle.

To provide for the insertion of a packing of tin-foil or analogous material 37 in connection with the insertion of the cork or stopper, a roll 38 of such material is carried at the rear of the main frame 1 upon a bracket-frame 39, projecting upwardly from the platform 2. From this roll the material 37 passes downwardly under and around a guide-roll 40, journaled with relation to an opening 41 in the platform 2, from whence the tin-foil or analogous material passes forwardly through an opening 42 in the platform 2 at a point under the guide-frame 28, over and across the tubular extension 27, and between two feed-rolls 43 and 44, respectively, arranged one above the other at the front of the main frame. (See Fig. 5.) The feed-roll mechanism is operated by means of a gear 45, meshing with a vertical rack 46 upon the front right-hand rod 47 of the sliding frame 5.

The shaft of the gear 45 is journaled in bearings upon the platform 2 and carries a ratchet mechanism 48, adapted to throw into gear another gear-wheel 49, meshing with an intermediate gear 50, which in turn meshes with the gear 51 upon the shaft 52 of the lower guide-roller 43. The arrangement of the ratchet mechanism and gears is such that on the upstroke of the rack-rod 47 the ratchet mechanism will not actuate the communicating gear-wheel 49, and there will consequently be no movement of the feed-rolls, so that the portion of the tin-foil or other material 37 immediately over the tubular extension 27 will remain stationary as the plunger is drawn upwardly. The material 37 will be carried downwardly with the cork in its insertion into the neck of the bottle as the plunger operates on the downstroke of the frame 5, and the relative arrangement of the mechanism is such that at an appropriate time on the downward movement of the frame 5, before the bottom of the plunger reaches the strip 37, the ratchet mechanism 48 will be operated to throw the intermediate gear mechanism governing the feed-rolls into play, so that the latter will operate to draw the material 37 forwardly into position for the operation of the plunger and the insertion of the cork. In contradistinction to this intermittent operation of the feed mechanism for the tin-foil or other packing material it will be noted that the mechanism for moving the sliding feed-block 29 by operation of the vertically-moving frame 5 has no ratchet mechanism, and the block-controlling mechanism will therefore be actuated both on the up and down stroke of the frame 5, it being necessary to turn the block rearwardly after it has first moved forwardly in carrying the cork into position under the plunger. I prefer to mount the top feed-roll 44 upon bearings in arms 53, pivotally mounted at their rear ends upon the platform 2 and having their front ends vertically adjustable by means of screws 54 in vertical threaded standards 55, projecting from the platform 2. (See Figs. 5 and 6.) This adjustable mounting enables the convenient controlling of the pressure between the feed-rolls 43 and 44 with relation to the feed of the tin-foil or other material, which passes between the same.

To provide for cutting a disk from the tin-foil or other material 37 of adapted size and form with relation to the cork or stopper to be inserted, I mount a vertically-sliding collar 56 within the tubular extension 27, said collar being preferably supported upon a shoulder 57 at the bottom of the latter. The top edge of the collar 56 is adapted to form a cutting edge with relation to an annular shoulder 58, formed in the bottom of the guide-frame 28, as shown in Fig. 5. This vertically-sliding cutter is provided at one side with a rack 59, engaged by a gear-wheel 60, mounted in bearings under the table 2. The gear-wheel 60 has its toothed periphery moving within a vertical groove or recess 61 in the front left-hand rod 62 of the frame 5, and within a recess 63 in said rod is mounted a spring-catch 64, projecting within the groove 61 and adapted to automatically engage the gear-wheel 60 on the downstroke of the rod 62 to cause the upward movement of the cutter 56. The relative construction and arrangement is such that this action occurs just before the cork and plunger move downwardly upon the material 37. The catch 64, by reason of its spring function, will engage the gear-wheel 60 on the upstroke of the rod 62 until the cutter is returned to normal position against the bottom shoulder 57, when the catch will spring over the pivoted periphery into normal position, ready for the next downstroke of the rod 62. (See Figs. 8, 6, and 5.)

The mechanism for carrying a label-strip over the top of the cork between the latter and the bottom of the plunger 18 is preferably arranged at a transverse angle with relation to the mechanism for feeding the packing material 37, as shown in Fig. 6. This label mechanism comprises a roll 65, mounted upon brackets 66 at the right-hand side of the table 2, from which roll the label-strip 67 passes diagonally across and over the table 2. The strip 67 first passes over a tension-roll 68, mounted in a boxing 69 upon the table 2, and from thence over the top of the guide-frame 28 at a point just above the tubular extension 27 and in line with the downward play of the plunger 18. The roll 68 operates to give the strip 67 the proper tension and elevation in its passage over the guide-frame 28 and beneath the plunger, and at the same time applies paste from the boxing or receptacle 69 to the under side of the strip. At the left-hand side of the table 2 the label-strip 67 is operated between two feeding-rollers 70 and 71, respectively arranged one above the other in a bracket-frame 72, projecting from the table 2. (See Figs. 6, 7, and 2.) To actuate this feed-roll mechanism, I provide a gear-wheel 73, meshing with a vertical rack 74 upon the rear left-hand rod 75 of the frame 5, which gear-wheel carries a ratchet mechanism 76 and a supplementary gear 77, meshing with a gear 78 upon the shaft of the top feed-roll 71. By reason of this construction and arrangement, on the upstroke of the rod 75 the ratchet-and-gear mechanism controlling the feed-rolls 70 and 71 is not operated, so that the label-strip 67 remains stationary as the plunger is drawn upwardly; but before the bottom of the plunger reaches the strip 67 on the downstroke of the frame 5 and rod 75 the ratchet-and-gear mechanism is thrown into operation, so that the strip 67 is drawn over and ready for the operation of the plunger in the insertion of the cork. I prefer to mount the bottom guide-roll 70 upon pivoted arms 79, having their outer ends adjustable by means of a set-screw 80, working in a projection 81 of the bracket device 72, whereby the pressure of the bottom roll 70 with relation to the upper roll 71 may be adjusted with respect to the feed of the label-strip 67.

The bottles are automatically carried into position under the tubular extension 27 and the inserting-plunger 18 by means of a belt mechanism carried upon the platform or table 4 of the supplementary frame 3 and operating across the machine or in the direction at right angles to the main frame 1. This mechanism comprises an endless belt 82, mounted upon rollers journaled in the table 4, and another endless belt 83, mounted upon shoulders journaled in the table 4 and arranged in parallel relation to and with a pitman at the side of the initial belt-carrying mechanism 82. Upon the table 4 is arranged a curved guide-track extending between the carrying-belts 82 and 83 and comprising curved side rails 84. (See Figs. 3 and 4.) The belt 83 is provided with a series of angular recesses 85, facing the initial plate 82, into which surface recesses the bottles are individually and respectively guided by the guide-track 84 from the belt 82 onto the belt 83, so that they are successively carried into accurate position under the tubular extension 27 at each operation of the main lever 14. The belts 82 and 83 move in the same direction and have their inner end shafts 86 provided with band-wheels 87, connected by a belt or chain 88, whereby a uniform travel or motion of the belts is effected.

To provide for the automatic operation of the carrying-belts, a gear-wheel 89 is journaled in bearings depending from the table 4 and meshes with a vertical rack 90 upon the lower portion of the rear right-hand rod 36 of the vertically-moving frame 5.

The shaft 91 of the gear-wheel 89 carries a crank or disk 92, connected by pitman 93 with a ratchet mechanism 94, carried upon the shaft 95 of the end roller or band-wheel 96 of the belt. The relative arrangement of this ratchet-and-gear mechanism is such that on the upstroke of the frame 5 the ratchet mechanism will not be operated and the belts will therefore remain stationary; but at an appropriate time, before the plunger and cork reach the bottle on the downstroke of the frame 5, the ratchet mechanism will be thrown into secure or locked connection with the roller or band-wheel 96, and the belts will be moved a sufficient distance to bring the bottle into position under the tubular extension 27, after which the belt mechanism will remain stationary during the remainder of the downstroke, so that the bottle is held in proper position for the insertion of the cork.

To provide for the adjustment of the ratchet mechanism with relation to the accurate feed of the bottles, the inner end of the pitman 93 is preferably adjustably connected to the crank or disk 92 by means of a connecting-block 97, adjustably secured in the dovetailed radial groove 98 in the face of the disk 92 by means of a set-screw 99.

The operation and advantages of my invention will be readily understood by those skilled in the art to which it appertains. By a single downstroke of the main operating-lever 14 the various distinctive mechanisms— to wit, the rocking cork-hopper, the tin-foil or packing-material feed mechanism, the label-strip-feed mechanism, the bottle-feeding mechanism, and the plunger mechanism— are all respectively and uniformly operated in one correlative complete movement. The mechanism also permits of various convenient adjustments for insuring an accurate and positive correlation between the movements or operation of the various mechanisms in the complete office for which they are designed.

Having thus described my invention, what

I claim as new, and desire to secure by Letters Patent, is—

1. A machine for corking bottles, comprising, in combination with a tubular feed-cylinder, a rocking hopper for the corks or stoppers pivotally mounted with relation to the feed-cylinder and embodying two independent receptacles having feed-channels from the inner ends of which the corks or stoppers are fed into the mouth of the cylinder, and means for actuating said hopper, substantially as and for the purpose set forth.

2. A machine for corking bottles, comprising, in combination with a tubular feed-cylinder, a rocking hopper for the corks or stoppers pivotally mounted with relation to the feed-cylinder, a main operating-lever, and a connecting-rod between said lever and the rocking hopper, substantially as and for the purpose set forth.

3. A machine for corking bottles, comprising a vertically-moving frame carrying the plunger, in combination with a mechanism for feeding a strip of tin-foil or other packing material in a plane below the plunger, said mechanism embodying feed devices actuated by mechanism meshing with the vertically-moving frame and carrying intermittently-operating mechanism whereby the movement of the vertical plunger-frame is communicated to the feed devices only during the stroke of said frame in one direction, substantially as and for the purpose set forth.

4. A machine for corking bottles, comprising a vertically-moving frame carrying the plunger, feed-rolls for operating a strip of tin-foil or other packing material with relation to said plunger, gear mechanism engaging a rack on said vertically-moving plunger-frame, and intermittently-operating governing mechanism whereby the movement of the gear mechanism is communicated to the feed-rolls only on the stroke of the plunger-frame in one direction, substantially as and for the purpose set forth.

5. A machine for corking bottles, comprising a vertically-moving frame carrying a plunger, and mechanism for feeding a strip of tin-foil or other packing material with relation to the plunger, said mechanism comprising feed devices actuated by mechanism meshing with said vertically-moving plunger-frame and carrying intermittently-operating mechanism whereby the motion of the plunger-frame is communicated to the feed devices only on the stroke of the frame in one direction, in combination with a cutter mechanism contacting upon the strip of packing material, and mechanism meshing with the plunger-frame and operating to actuate the cutter devices by the stroke of said frame, substantially as and for the purpose set forth.

6. A machine for corking bottles, comprising a vertically-moving frame carrying the plunger, feed-rolls for operating a strip of tin-foil or other packing material in a plane with the stroke of the plunger, gear mechanism meshing with a rack upon said plunger-frame and connected with the feed-rolls, intermittently-operating mechanism for communicating the motion of the plunger-frame to the feed-rolls only on the stroke of said frame in one direction, a vertically-moving cutter operating with relation to the strip of packing material, and gear mechanism meshing with the cutter and plunger-frame and actuating the cutter by the stroke of the frame, substantially as and for the purpose set forth.

7. A machine for corking bottles, comprising a tubular extension through which the corks or stoppers are adapted to be forced by the plunger, mechanism for carrying a strip of tin-foil or other packing material across the top of said tubular extension, a collar mounted within said tubular extension and forming a cutter operating with relation to the strip of packing material, and means for operating said cutter, substantially as and for the purpose set forth.

8. A machine for corking bottles, comprising a vertically-moving frame carrying the plunger, a tubular extension through which the corks or stoppers are adapted to be forced by the plunger, mechanism for feeding a strip of tin-foil or other packing material across said tubular extension, a collar mounted in the tubular extension and forming a cutter operating with relation to said packing material, a gear meshing with a rack upon said collar and devices upon the plunger-frame for actuating said gear, substantially as and for the purpose set forth.

9. A machine for corking bottles, comprising a vertically-moving frame carrying the plunger, a guide-frame through which the corks are fed into position with relation to the plunger, said guide-frame having an annular shoulder at its bottom, a tubular extension in line with the movement of the plunger, a collar mounted in said tubular extension and forming a cutter operating with relation to said annular shoulder upon the guide-frame, mechanism for feeding a strip of tin-foil or other packing material between said guide-frame and the top of said collar, and means for operating said collar, substantially as and for the purpose set forth.

10. A machine for corking bottles, comprising a vertically-moving frame carrying a plunger, a guide-frame through which the corks are carried into position with relation to the plunger, a sliding block operating in said guide-frame, and operating mechanism connected with said sliding block and engaging the vertically-moving plunger-frame, substantially as and for the purpose set forth.

11. A machine for corking bottles, comprising a vertically-moving frame carrying a plunger, a guide-frame through which the corks or stoppers are fed with relation to the plunger, mechanism for feeding a label-strip over said guide-frame on a plane with relation to the operation of the plunger, operating mechanism connected with said feed mechanism and with the plunger-frame, and intermittently-operating mechanism for actuating the feed mechanism only on the stroke of the plunger-frame in one direction, substantially as and for the purpose set forth.

12. In a machine for corking bottles, two relatively-arranged bottle-carrying belts one of which has a series of recesses for the reception of the individual bottles, in combination with a guide-track extending between the two belts, whereby the bottles are automatically guided during the operation of the belts from the initial belt into the recesses of the other belt, substantially as and for the purpose set forth.

13. In a machine for corking bottles, a carrying-belt provided with a continuous series of recesses in its surface, an initial carrying-belt arranged at the side of the recessed belt and with relation thereto, said initial belt being in front of the open end of the recesses, a curved guide-track extending from the initial belt to the recessed belt and embodying side rolls, whereby the bottles are automatically guided from the initial belt into individual position in the recesses of the recessed belt, and means for relatively operating said belts, substantially as and for the purpose set forth.

14. A machine for corking bottles, comprising a vertically-moving frame carrying the plunger, operating mechanism meshing with the vertically-moving plunger-frame, a carrying-belt for conveying the bottles into position, intermittently-operating mechanism connected with the belt and adapted to actuate the latter only on the stroke of the plunger-frame in one direction, said belt having recesses in one side adapted to receive and retain bottles, and devices connecting said intermittently-operating mechanism and the main operating mechanism, substantially as and for the purpose set forth.

15. A machine for corking bottles, comprising a vertically-moving plunger-frame, a plunger connected with and carried by said frame and having a limited independent movement with relation to the movement of the carrying-frame, and means for controlling the independent movement of the plunger, whereby the air exhaust in the operation of corking a bottle is permitted by the independent limited movement of the plunger, substantially as and for the purpose set forth.

16. A machine for corking bottles, comprising a main frame, a supplementary lower frame in transverse relation to the main frame, a vertically-moving frame operating within the main and supplementary frames and carrying the plunger, cork-feeding mechanism mounted upon the main frame with relation to the vertically-moving plunger-frame, conveying mechanism for carrying bottles mounted in the transverse supplementary frame, operating mechanism respectively connecting the cork-feeding mechanism and the bottle-conveying mechanism with the vertically-moving plunger-frame, and means for operating said plunger-frame, whereby the complete operation is effected by the stroke of the vertically-moving plunger-frame, substantially as and for the purpose set forth.

17. A machine for corking bottles, comprising a main frame, a supplementary lower frame, a vertically-moving frame carrying the plunger and working within the main and supplementary frames, cork-feeding mechanism mounted upon the main frame with relation to the plunger-frame, mechanism mounted upon the main frame for feeding a label-strip and strip of packing material with relation to the plunger, conveying mechanism mounted in the supplementary frame for carrying the bottles, operating mechanism directly connecting the various supplementary mechanisms with the vertically-moving plunger-frame, and means for operating the plunger-frame, whereby a complete movement of the entire mechanism is effected by one complete movement of the plunger-frame, substantially as and for the purpose set forth.

18. A machine for corking bottles, comprising a main frame, a supplementary lower frame, a vertically-moving plunger-frame operating within the main and supplementary frames and carrying the plunger and embodying corner-rods provided with racks, cork-feeding mechanism mounted upon the main frame, gear mechanism connecting said cork-feeding mechanism with one of the rack-bars of the plunger-frame, conveying mechanism mounted in the supplementary frame for carrying the bottles into position, intermittently-operating gear mechanism connected with the conveyer mechanism and meshing with one of the rack-bars of the plunger-frame, and means for operating said rack-bar plunger-frame, substantially as and for the purpose set forth.

19. A machine for corking bottles, comprising a main frame, a supplementary lower frame in transverse relation thereto, a vertically-moving plunger-frame working within the main and supplementary frames and carrying the plunger and provided with corner-bars having racks, a cork-feed mechanism mounted upon the main frame with relation to the plunger-frame, gear mechanism connecting said cork-feed mechanism with one of the rack-bars of the plunger-frame, mechanism mounted upon the main frame for feeding a label-strip and a strip of packing material with relation to the plunger, intermittently-operating gear mechanism connecting said strip-feeding mechanism with one of the rack-bars of the plunger-frame, conveying-belt mechanism mounted in the transverse supplementary frame for carrying the bottles into position, intermittently-operating mechanism connecting said conveyer mechanism with one of the rack-bars of the plunger-frame, and means for operating said plunger-frame, whereby one complete movement of all the supplementary operating mechanisms is effected by one movement of the plunger-frame, substantially as and for the purpose set forth.

In testimony that I claim the foregoing as my invention I have signed my name, in presence of two witnesses, this 12th day of March, 1897.

GOVEURNEER GRAHAM BROWN.

Witnesses:
B. McComb,
M. G. MacLean.